United States Patent [19]

Goff et al.

[11] Patent Number: 5,052,310
[45] Date of Patent: Oct. 1, 1991

[54] SOLID WASTE-TO-STEAM INCINERATOR CAPACITY ENHANCEMENT BY COMBINED OXYGEN ENRICHMENT AND LIQUID QUENCH

[75] Inventors: Stephen P. Goff, Kutztown; Joseph Klosek, Wescosville; Donald P. Bucci, Mertztown; Paul A. Kinniry, Ambler, all of Pa.

[73] Assignee: Air Products and Chemicals, Inc., Allentown, Pa.

[21] Appl. No.: 644,190

[22] Filed: Jan. 22, 1991

[51] Int. Cl.$^5$ ................................................ F23B 7/00
[52] U.S. Cl. ...................................... 110/234; 110/103; 110/186; 110/188; 110/346; 122/2; 236/14
[58] Field of Search ............... 110/234, 235, 103, 185, 110/186, 188, 346; 122/2; 236/14

[56] References Cited

U.S. PATENT DOCUMENTS

| | | | |
|---|---|---|---|
| 3,403,643 | 10/1968 | Denig | 110/10 |
| 3,918,374 | 11/1975 | Yaniamoto et al. | 110/8 |
| 4,279,208 | 7/1981 | Guillaume et al. | 110/346 |
| 4,520,741 | 6/1985 | Carbeau et al. | 110/344 |
| 4,630,555 | 12/1986 | Guillaume et al. | 110/346 |
| 4,762,074 | 8/1987 | Sörensen | 110/346 |
| 4,846,082 | 7/1989 | Marangohi | 110/234 |
| 4,928,606 | 5/1990 | Mullen | 110/188 X |

OTHER PUBLICATIONS

W. S. Strauss, J. A. Lukens, F. K. Young, F. B. Bingham, "Oxygen Enrichment of Combustion Air in a 360 TPD Mass Burn Refuse-Fired Waterwall Furnace", proceeding of 1988 National Waste Processing Conf., 13th Bi-Annual Conf., pp. 315-320, May 1-4, 1988.

Primary Examiner—Edward G. Favors
Attorney, Agent, or Firm—Thomas G. Ryder; James C. Simmons; William F. Marsh

[57] ABSTRACT

A process is disclosed for controlling the combustion and temperature in an solid waste-to-steam incineration system comprising a grated combustion zone and a steam boiler. This control is achieved by a synergistic combination of oxygen enrichment of an air stream and liquid quench fed to the combustion zone. The disclosed process includes the steps of adjusting the amount of solid waste passing into the combustion zone in order to maintain a constant flow of steam leaving the steam boiler, adjusting the amount of liquid quench to the incinerator in order to maintain a constant temperature in the combustion zone and adjusting the amount of oxygen enrichment of the air stream in response to a change in flow of the liquid quench to the incinerator. An apparatus for accomplishing the foregoing is also disclosed.

28 Claims, 7 Drawing Sheets

SOLID WASTE-TO-STEAM INCINERATOR CAPACITY ENHANCEMENT BY COMBINED OXYGEN ENRICHMENT AND LIQUID QUENCH

FIELD OF THE INVENTION

This invention relates to municipal solid waste (MSW)-to-steam incinerators. More particularly, it relates to the combined use of oxygen enrichment and liquid quench in order to control the combustion and temperature in the MSW incinerator to achieve an overall capacity enhancement.

BACKGROUND OF THE INVENTION

An MSW incinerator is typically designed to combust a set amount of MSW per day with a given flow of combustion air resulting in a given flow rate of flue gas of controlled composition. It is well known to increase the MSW capacity of an incinerator by oxygen enrichment of the combustion air or by simply reducing the design flow of the combustion air to the incinerator. Oxygen enrichment has the effect of removing nitrogen from the flue gas composition and allows additional MSW to be combusted while maintaining the design flue gas flow rate and concentration of oxygen in the flue gas. Reducing the design flow of combustion air has a similar affect on MSW capacity enhancement as oxygen enrichment, except that it causes a reduction of the excess oxygen in the flue gas. One of the major problems in both of these approaches for enhancing incinerator capacity is that the combustion temperature rapidly increases beyond the physical and mechanical integrity of the furnace as the nitrogen is removed from the flue gas or there is a reduction of the excess oxygen in the flue gas. Further, the reduction of the excess oxygen concentration can impair the combustion efficiency leading to high carbon monoxide levels and can diminish the final destruction of toxic organic compounds. Therefore, there is a great need for an MSW incinerator process and an apparatus for controlling the combustion temperature in conjunction with oxygen enrichment or a reduction in the combustion air flow.

A second problem related to the operation of the modern MSW-to-energy incinerators, is controlling the combustion process to maintain a minimum MSW disposal rate and a constant steam production to a turbine generator, a district heating system, an adsorption evaporative heating or cooling system or other end use. Because MSW is a very heterogeneous fuel which varies considerably in composition, moisture content and heating value, frequent changes must be made to the combustion air rate and the MSW feed rate to maintain the combustion furnace conditions within the designed range. For example, the combustion temperature in the furnace will quickly decrease if the feed changes to a lower heating value, higher moisture content MSW. In such a case, the initial response of the operator is to decrease the flow of the combustion air to maintain a constant temperature in the furnace. However, one is severely restricted in how far the combustion air can be reduced because of:

(a) Permit restrictions on the minimum allowable excess oxygen level in the flue gas.
(b) Permit restrictions on the carbon monoxide concentration in the flue gas which will increase with the reduced excess oxygen.

Even if the operator is able to control the furnace temperature within the design range, the heat release to the steam boiler will decrease due to the reduced heating value of the MSW fed to the incinerator. Unless the operator can increase the MSW throughput, the steam production will be decreased. However, the lower heating value, higher moisture content MSW requires longer residence time in the furnace to achieve the desired total burnout. Increasing the throughput of a higher moisture content MSW while reducing the excess oxygen concentrations in the flue gas to a composition within the permit restriction requirements in order to maintain the desired combustion temperature, often results in an incomplete burnout in the incinerator bottom ash. The net result in such a case is that the steam production to the turbine generator or other end use is usually reduced in response to periods when the MSW is very wet in order to maintain the desired ash burnout and excess oxygen levels in the flue gas. Therefore, there is a further need for an MSW incinerator process and apparatus for controlling the combustion conditions and maintaining MSW throughput and steam production during those periods when the MSW is very wet.

A third problem in the general field of waste disposal is finding economical and environmentally safe methods for disposing of sewage sludge from wastewater treatment plants. While there are many disposal methods in the prior art, the cost and environmental acceptability of such methods are becoming of more critical concern to our society today, especially in urban areas. While sewage sludge combustion is a commercially proven process for such disposal, the high moisture content of typical sludges, which ranges from 80 to 98 wt. % free moisture, necessitates firing supplemental fuels, such as natural gas or fuel oil, to maintain the required combustion temperature. The use of such declining natural resources has obvious economic disadvantages. Co-incineration of sewage sludge with MSW has been commercially practiced. However, as the sludge moisture contents increase, the use of supplemental fuels is required. Therefore, there is a still further need for an MSW incinerator process and apparatus for co-incineration of sewage sludge and MSW which overcomes these obstacles without having to resort to the use of supplemental fuels in order to maintain the combustion temperature at a constant level.

A fourth problem in this field is the disposal from a typical MSW incinerator of the wastewater generated therein in rather large amounts or wastewater generated from another source. Therefore, there is still further a need for an MSW incinerator process and apparatus which has the design feature of eliminating the net wastewater flow from the incinerator or disposing of additional wastewater from other process plants.

H. S. Strauss, J. A. Lukens, F. K. Young and F. B. Bingham, "Oxygen Enrichment of Combustion Air in a 360 TPD Mass Burn Refuse-Fired Haterwall Furnace", Proceedings of 1988 National Waste Processing Conference, 13th Bi-Annual Conference, pages 315-320, 1-4 May 1988, proposed the use of oxygen enrichment to debottleneck one of the oldest operating waste-to-steam facilities in the Hestern Hemisphere. However, the experiments carried out by Air Products and Chemicals, Inc., were limited to low levels of oxygen enrichment because of the design temperature limits in the furnace. The authors discussed increasing the available oxygen in the combustion air to the furnace from 21% to 23%, i.e. a 9.5% increase in $O_2$ or a 2% increase in $O_2$ enrichment, which meant that a 9.5% decrease in combustion air should result if all the increase were used and if there were no increase in the oxygen concentration in the flue gas. The authors concluded that this increase in $O_2$ enrichment would allow "room" for increased throughput of waste. However, increases in $O_2$ enrichment result in an adiabatic combustion temperature rise in the furnace. For example, if only a 3% $O_2$ enrichment were maintained, a 400° F. rise in the furnace temperature would result. Such a rise in temperature would exceed the metallurgical limitations in the grate system and the downstream boiler equipment. In fact, the authors state that one of the concerns expressed by the German manufacturer of the grate system in the waste-to-energy furnace was damage to the grates for that very reason. As a consequence, a minimum depth of 2 feet of waste was maintained at all times on the grates during the experiments. Prior to the present invention, oxygen enhancement of 1 to 2% of combustion air to an MSW incinerator was all that was believed to be practical.

The authors of the foregoing reference suggested that dramatic results would probably be gained if the refuse to the incinerator had a very high moisture content such as after a soaking rain or heavy snow. The expectation was that a thinner bed of waste on the grates would result in a better burnout; the ability to direct the oxygen-enriched air to the lower end of the grate would also result in a better burn out; and the fact that less air volume would be needed for the same combustion to "make room" for the extra water in the flue gas which would allow for sustained mass flow of MSW. In actual practice, the authors admitted that any comparison between high moisture contents runs with and without oxygen enrichment was difficult. They did conclude that high moisture content sludge could be run through the system with oxygen enrichment without a degradation of either steam production or ash quality. Although, there is the foregoing disclosure of a combination of oxygen enrichment and use of either high moisture content MSW or large inputs of sewage sludge, there is no suggestion in this reference of the process or apparatus of the presently claimed invention.

Supplemental fuel is required to maintain the combustion temperature within design limits in those cases that are practiced commercially using co-incineration of sewage sludge with MSW. Co-incineration requires the incinerator to be designed for such practice initially, so that additional flue gas flow resulting from the combined sludge, supplemental fuel and associated combustion air are taken into consideration.

In general, MSW incinerators have been designed to enable the incineration of wet MSW with the primary emphasis on the operator's ability to mix MSW with high energy waste such as tires; see page 317 of the foregoing Strauss et el reference. This practice has limited effectiveness, however, since the waste moisture content, the major compositional variable, is primarily a function of the weather in the region which leads to significant variation in the overall moisture content of the MSW. Again, the common design feature to alleviate the problem is to fire supplemental fuel to increase the average heating value of the fuel plus waste being combusted with its obvious disadvantage of economies.

Figure 5:
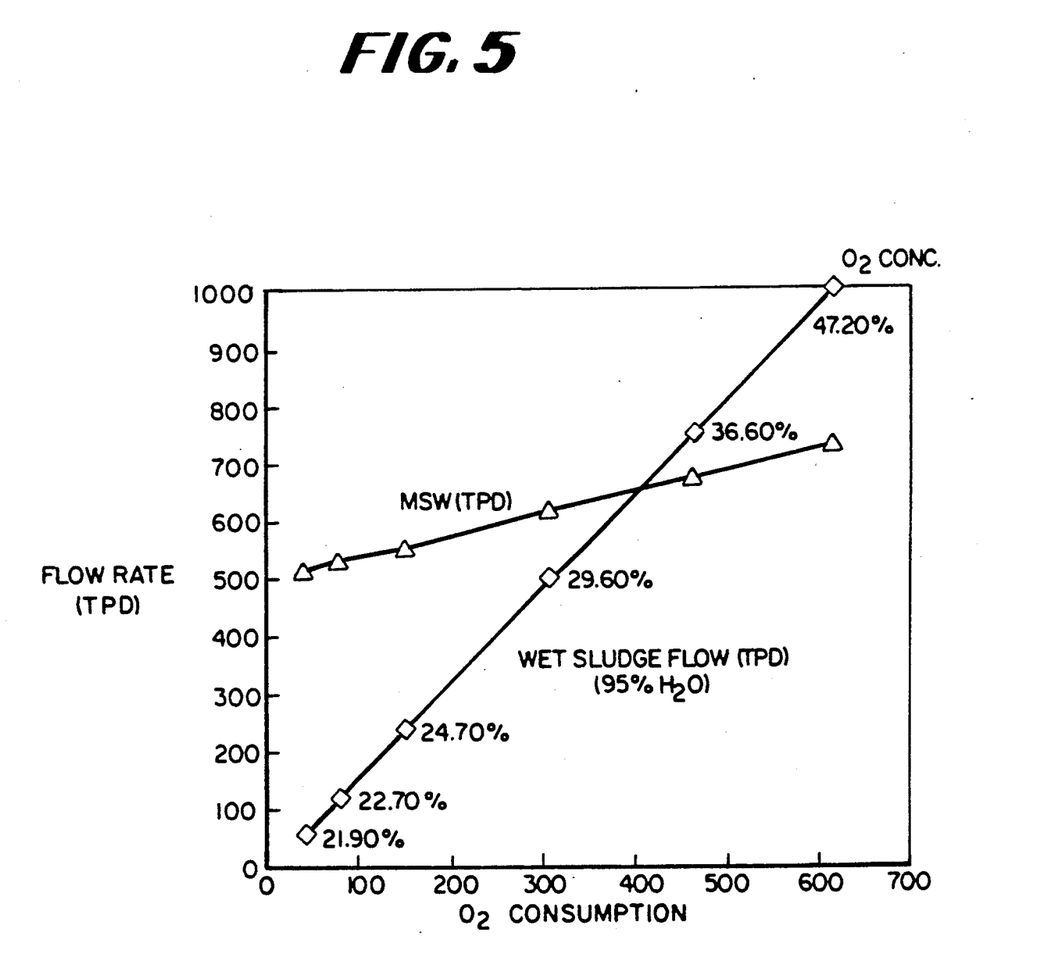
FIG. 5 is a graph showing the relationship between MSW incineration capacity and oxygen consumption at 95% water in the sludge.

U.S. Pat. No. 3,403,643 discloses a waste incineration process using oxygen enrichment where the oxygen content is claimed to range from 25 to 50%. The air enrichment is disclosed to accelerate the refuse burning and allows one to achieve more complete combustion thus reducing malodorous gases. FIG. 5 of this patent charts the extremely high temperatures attained in combustion and shows increases from just under 2,000° F. to almost 5,000° F. The latter case is based on 40% oxygen enrichment and less than 10% surface water being present in the waste. As set forth above, such temperature increases are well beyond the structural limits of MSW incinerators.

U.S. Pat. No. 3,918,374 describes a multi-stage process and apparatus for thermally decomposing or gasifying garbage in which the garbage is charged to a first stage incinerator gasified by external heat without oxygen. The gas produced in the first stage along with additional garbage is charged to a second stage where the gas is combusted with pure oxygen in stoichiometric quantities. The gas produced in the second stage can, in turn, be burned in a third stage to thermally decompose garbage from the second stage.

U.S. Pat. No. 4,279,208 discloses a process and apparatus in which industrial waste is initially pyrolyzed and a portion combusted in the presence of enriched air. By regulating both the enriched air composition and flow rate, it is stated that it is possible to control the furnace temperature and excess oxygen at optimum levels for the waste pyrolysis. A second enriched air stream is then injected into the gas produced in the first stage during a secondary combustion step in which the temperature ranges from 1300° to 1600° C. It was stated that make-up fuel is required when the heating value of the waste is less than 2500 Kcal/kg.

U.S. Pat. No. 4,520,741 describes a system for incinerating liquid or slurry hazardous or toxic wastes, e.g. PCB's, in a two stage combustion process using oxygen-enriched air. The first stage runs at temperatures in excess of 4000° F. for a very short time, i.e. a few milliseconds, to decompose the hazardous/toxic hydrocarbons into less complex chemicals. The second stage is conducted in excess air at lower temperatures, i.e. 2,000° to 2600° F. for about two seconds to insure complete combustion.

U.S. Pat. No. 4,630,555 describes a discontinuous waste incineration process in which a furnace temperature is lowered to 650° C. (1202° F.) and the waste charge is introduced, pure oxygen is injected at sonic velocity above the waste to oxidize the gas formed from the pyrolysis of the waste and liquid water is used to quench the pyrolyzed waste to limit temperatures to about 850° C. (1562° F.).

The preceding four patents employed a pyrolysis or gasification step prior to a final combustion step. These patents do not suggest a solution to the problems set forth above in connection with oxygen enrichment in a mass burn design because of the differences in waste feed requirements, process and equipment design and operating conditions.

U.S. Pat. No. 4,762,074 describes a process for destroying dioxin and furan precursors and reducing $NO_x$ formation in waste incineration by using oxygen enriched air. Enrichment is specified from 27 to 32% with a minimum combustion temperature of 1200° C. It is stated that there is a reduction of $NO_x$ formation due to the reduction in atmospheric nitrogen during the oxygen enrichment. There is no discussion of the effect of the increased temperatures in the combustion chamber due to the oxygen enrichment on $NO_x$ formation.

SUMMARY OF THE INVENTION

The disclosed method for controlling the combustion and temperature in a solid waste-to-steam incineration system substantially reduces or eliminates the shortcomings associated with the prior art techniques. Solid waste such as MSW is passed into a combustion zone of the incineration system to serve as a source for fuel for the generation of steam from a steam boiler within the incineration system. The rate of flow of the solid waste to the combustion zone is measured and adjusted in response to the flow of steam that is produced in the steam boiler. A quench is fed into the combustion zone and its rate of flow is measured and adjusted in response to the temperature in the combustion zone. Oxygen is added to combustion air and the oxygen enriched air is fed into the combustion zone. The oxygen enrichment of combustion air is maintained by a response to a change in the flow rate of quench. By the simultaneous control of these flow rate parameters for the solid waste, quench and oxygen enrichment, one is able to maintain substantially constant combustion as measured by a substantially constant flow of steam and a substantially constant combustion temperature.

DETAILED DESCRIPTION OF THE INVENTION

Figure 1:
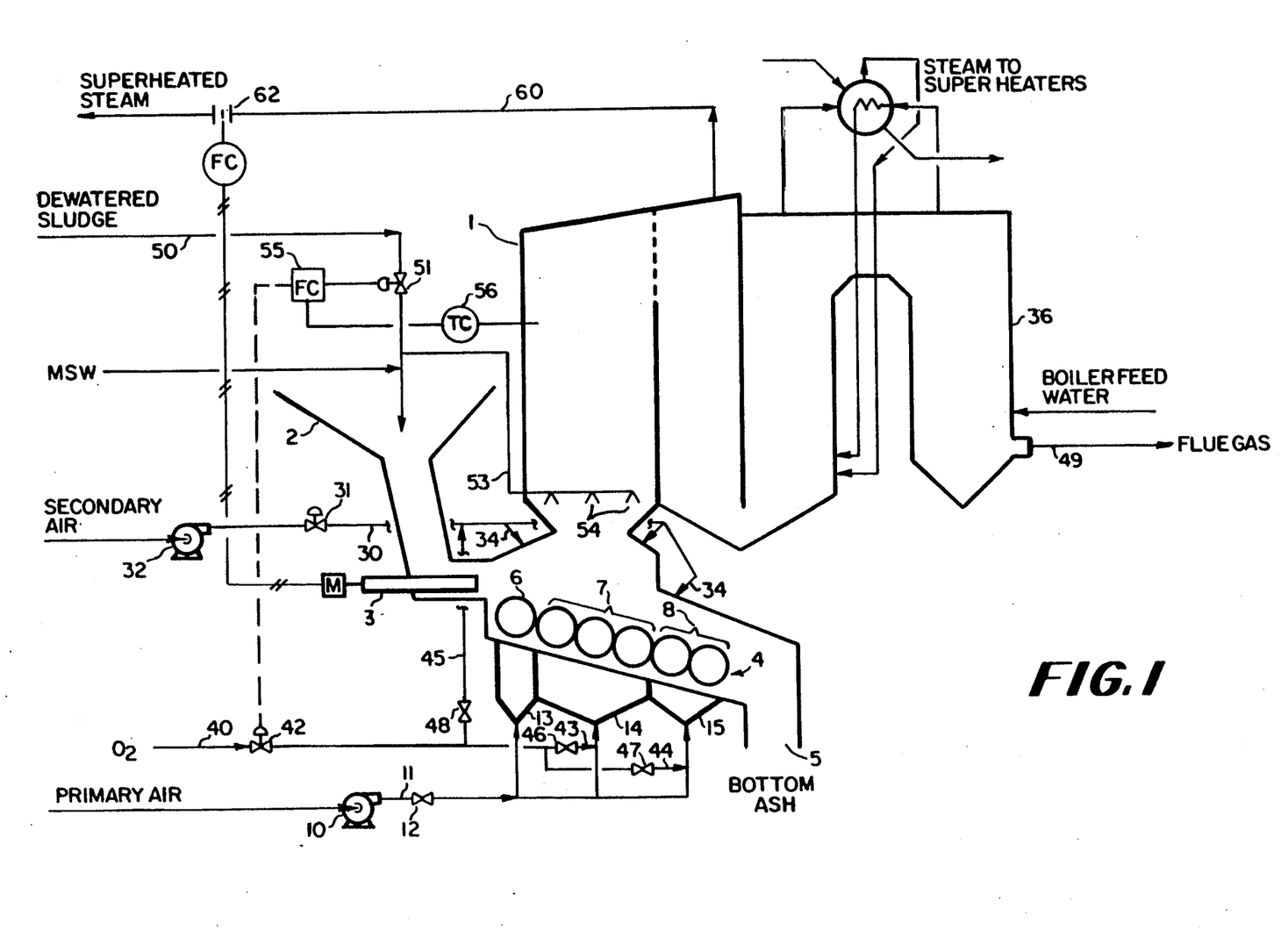
FIG. 1 is process flow diagram of the presently claimed invention.

Referring to FIG. 1, in which a preferred MSW-to-steam incineration system 1 of the present invention is illustrated. The MSW is introduced to feed chute 2 and is fed by ram feeder 3 or other solid flow regulation device, i.e. screw feeder lock hopper and the like, to the top of inclined grate 4 of incinerator 1. The MSW moves down grate 4 as it burns while passing, in turn, drying zone 6, combustion zone 7, and burnout zone 8. The ash remaining after substantially complete combustion of the MSW is removed from bottom 5 of grate 4. Primary combustion air, from a source not shown, is introduced by means of blower 10 through line 11 and flow control valve 12. The primary air is channelled into ducts 13, 14, and 15 which introduce air into drying zone 6, combustion zone 7 and burnout zone 8, respectively, from beneath grate 4.

Secondary air, from a source not shown, may be introduced through line 30 and flow control valve 31 by means of blower 32. The secondary air then divides into a plurality of lines 34 for injection above grate 4 to improve the mixing of oxygen and combustion gases and to insure complete combustion of the vaporized organics in the flue gas before it enters boiler 36. Oxygen, from a source not shown, passes through line 40 and flow control valve 42 and is diverted into lines 43, 44 and 45 where it is respectively fed into ducts 14 and 15 and line 30. The oxygen passing through lines 43, 44, and 45 is controlled by valves 46, 47 and 48, respectively. The level of oxygen enrichment entering combustion zone 7 and burnout zone 8 via ducts 14 and 15 and secondary air line 30 are thus independently controlled. While the distribution of oxygen between primary air ducts 14 and 15, and secondary air line 30 will effect combustion, as does the distribution of primary and secondary air, the exact way this is accomplished is not critical to the process of the present invention. One of ordinary skill in the art can easily devise a variety of ways for accomplishing the critical step of introducing oxygen-enriched air into the incinerator.

The combined oxygen-enriched primary air and oxygen-enriched secondary air streams contain a large excess of oxygen for the dual purpose of controlling the combustion temperature and to insure that adequate oxygen is available in all zones in the furnace. Typical design conditions of the flue gas following the addition of secondary air are a temperature of 1800° F. and a concentration of 10% volume oxygen on a dry basis. The oxygen enrichment removes inert nitrogen from the flue gas and allows additional MSW to be combusted.

The combustion temperature increase that would normally accompany the oxygen enrichment is tempered by the direct liquid quench addition to the MSW in feed chute 2. The quench is fed through line 50 and flow control device 51 to chute 2. Alternatively the quench may be passed through line 53 to a plurality of spray nozzles 54 above grate 4. Although the vaporized water of the quench to some extent replaces the nitrogen removed from the flue gas by oxygen enrichment, the net result is an increase in the MSW capacity for the same flue gas flow rate. Flow controller 55 controls the rate of the flow of the quench through flow control device 51 in response to the temperature in the first boiler pass of incinerator 1 as measured by thermocouple 56. Flow controller 55 adjusts control device 51 to increase the flow rate of quench in response to an increase in the first pass temperature. The change in the flow rate of quench in turn controls the flow rate of the oxygen enrichment stream through control valve 42.

The final critical control feature of the present invention is that of maintaining the rate of flow of the superheated steam that passes through line 60 and flow meter 62. Variatons in the flow of steam through meter 62 causes changes in the rate of flow of MSW entering incinerator 1 as will be set forth in detail below.

The synergistic combination of the control of the flow rate of MSW, the control of the flow rate of oxygen into the combustion air and the control of the liquid quench flow rate enables the operator to maintain the parameters of combustion temperature and excess oxygen concentration in the flue gas unchanged from the original design while achieving an increase in MSW capacity.

Although quench liquid may be ordinary make-up water, it is preferred that either wet sewage sludge from a municipal wastewater treatment plant or the wastewater from the MSW incineration facility itself be used. Sewage sludge is particularly attractive since it commands a high disposal fee in some areas of the country. In addition, the use of supplemental fuel which is normally required in sewage sludge incineration is not needed when it is integrated with oxygen enrichment as in the process of the present invention.

Sewage sludge contains typically 80 to 98% water depending on the extent of the treatment in the wastewater plant. The water component of the sludge performs as the quench medium in the proposed process. The solids in the sewage sludge contain a large fraction of carbon which are combustible and will add heat to the process. The solids will therefore, represent a portion of the capacity enhancement to the incinerator along with any increase in MSW capacity.

When sewage sludge is used as the quench medium, the sludge from the waste treatment facility, without any additional preprocessing or drying, is sent to the incinerator where it is combusted with the oxygen enriched air as described above. The flow rates of sludge and MSW and the degree of oxygen enrichment are all controlled to simultaneously maintain the combustion temperature, the superheated steam flow rate and the oxygen content in the flue gas from the incineration system unchanged from the base case operation without oxygen enrichment.

Figure 2:
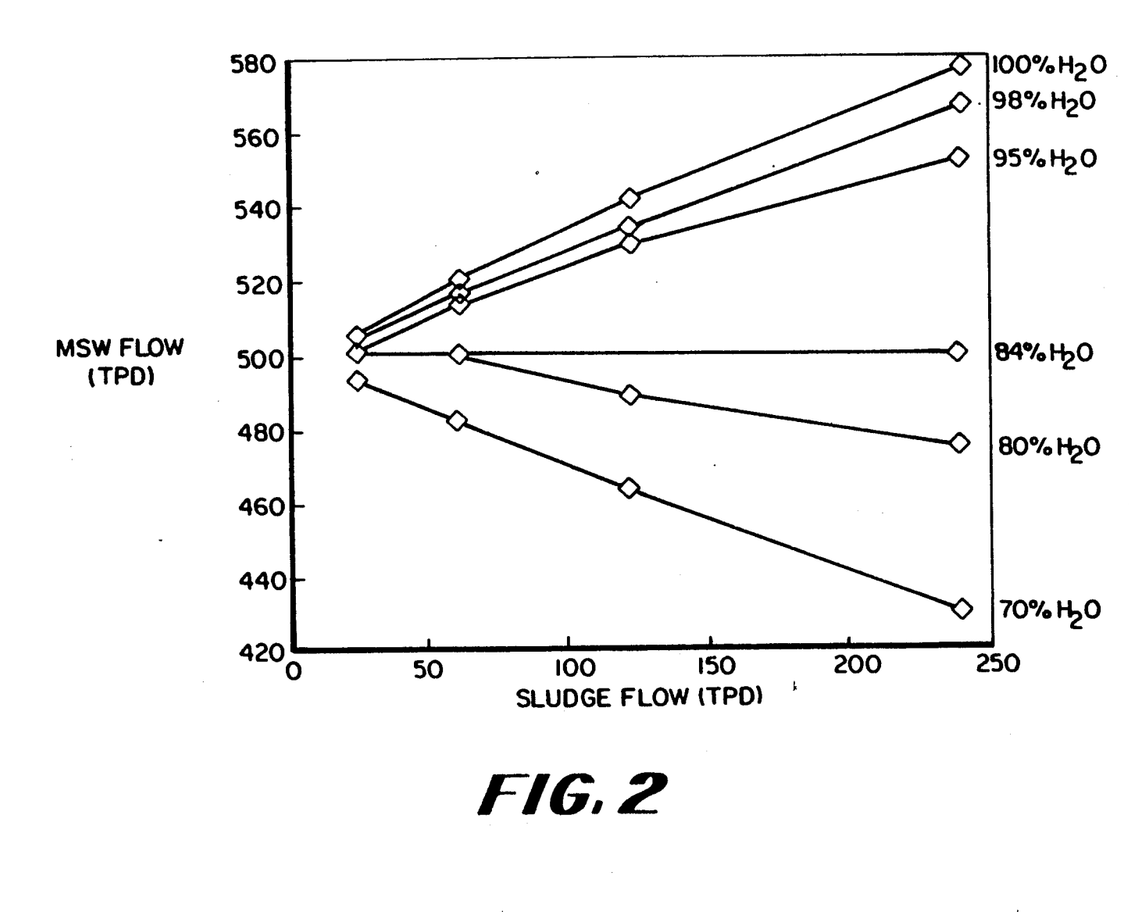
FIG. 2 is a graph showing the relationship between MSW incineration capacity and sewage sludge capacity at different sludge moisture contents.

High moisture content (equal to or greater than 85 wt. % water) sewage sludge has a negative lower heating value (LHV). This means that the energy released by the combustion of the sludge solids is less than is needed to vaporize the moisture content of the sludge. Therefore, to maintain the same heat release, i.e. constant flow of superheated steam from the steam boiler as measured by flow meter 62, and constant combustion temperature as without the sludge, additional MSW must be fed through feeder 3 to incinerator 1. This is illustrated in FIG. 2. At low moisture contents, less than about 85 wt. % water, the sludge has a positive LHV. This means that the energy released by the combustion of the solid sludge is greater than that needed to vaporize the moisture. To maintain the design heat release and combustion temperature, the flow rate of the MSW to the incinerator must be reduced and replaced with nitrogen from the air. The capacity enhancement in this case is entirely in the form of sewage sludge solids disposal less some MSW capacity. The moisture content of the sludge affects its physical form and how it is injected into the incinerator. At very high moisture contents, above 95 wt. % water, the sewage sludge is a liquid slurry and can be sprayed into the furnace above the burning bed of MSW on grate 4 through spray nozzles 54. At low moisture contents, below about 85 wt. % water, the sludge is in more of a solid phase and has to be mixed with MSW being fed onto the grate 4 through MSW feed chute 2. The flue gas through line 49 remains constant in the above example.

FIGS. 3-7 present total MSW capacity and quench flow versus oxygen consumption and percent oxygen enrichment for moisture contents in the wet sewage sludge quench of 70%, 80%, 95% and 98%, respectively and for 100% water. The results in the FIGS. 3-7 were generated by a computer simulation of an MSW incinerator designed to originally process 500 tons per day (TPD) of MSW. The process parameters for the design case are:

| | |
|---|---|
| Adiabatic combustion temperature = | 2450° F. (underfire) |
| Excess oxygen in flue gas equal v ume = | 10% (dry) |
| Flue gas flow rate = | 11,120 lb. moles/hr. |

These parameters are maintained unchanged in the examples using oxygen enrichment with sewage sludge quench. Typical compositions of MSW and dry sludge used in the computer simulated examples below are as follows:

TABLE I

| | MSW | Dry Sewage Sludge |
|---|---|---|
| | Wt. % | Wt. % |
| Carbon | 28.4 | 43.0 |
| Hydrogen | 3.8 | 6.0 |
| Oxygen | 22.8 | 24.0 |
| Nitrogen | 0.44 | 4.0 |
| Sulfur | 0.13 | — |
| Chlorine | 0.40 | — |
| Ash | 17.9 | 23.0 |
| Moisture | 26.13 | — |
| | BTU/lb. | BTU/lb. |
| HHV | 5200 | 8240 |
| LHV | 4564 | — |

Figure 3:
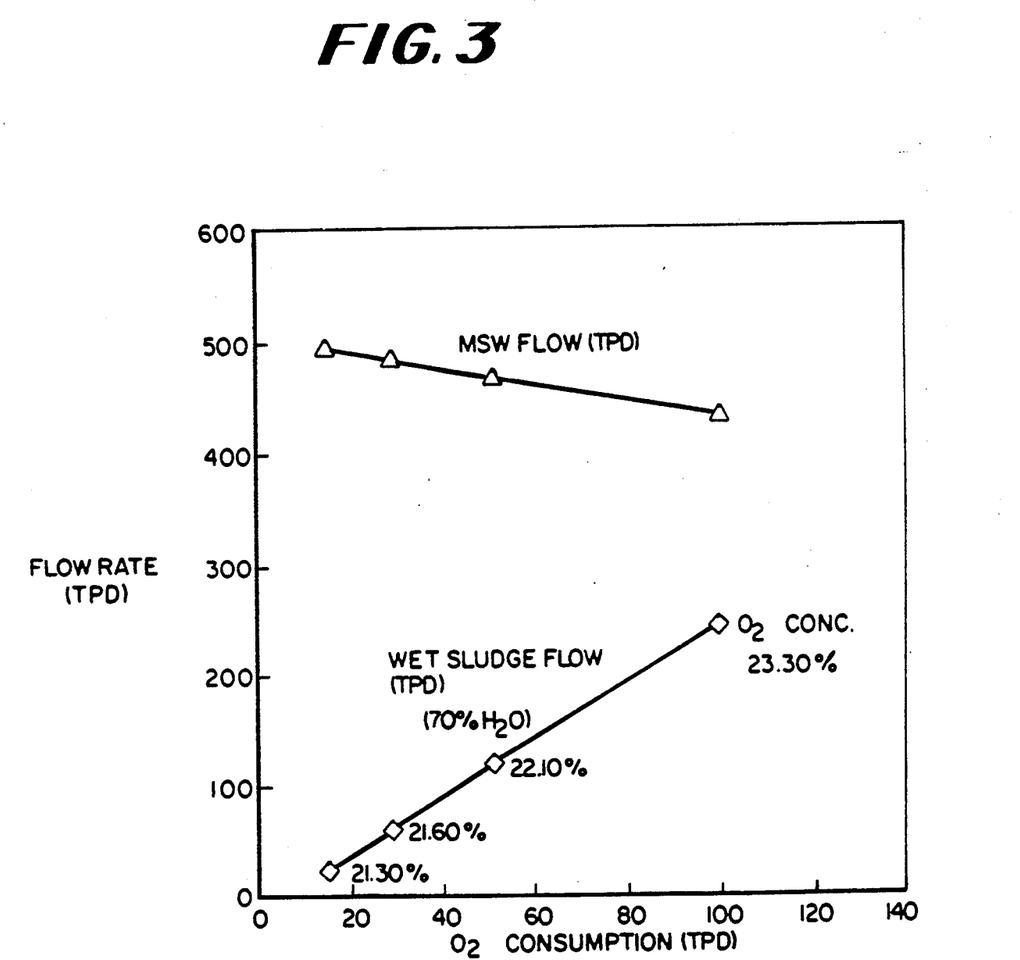
FIG. 3 is a graph showing the relationship between MSW incineration capacity and oxygen consumption at 70% water in the sludge.
Figure 4:
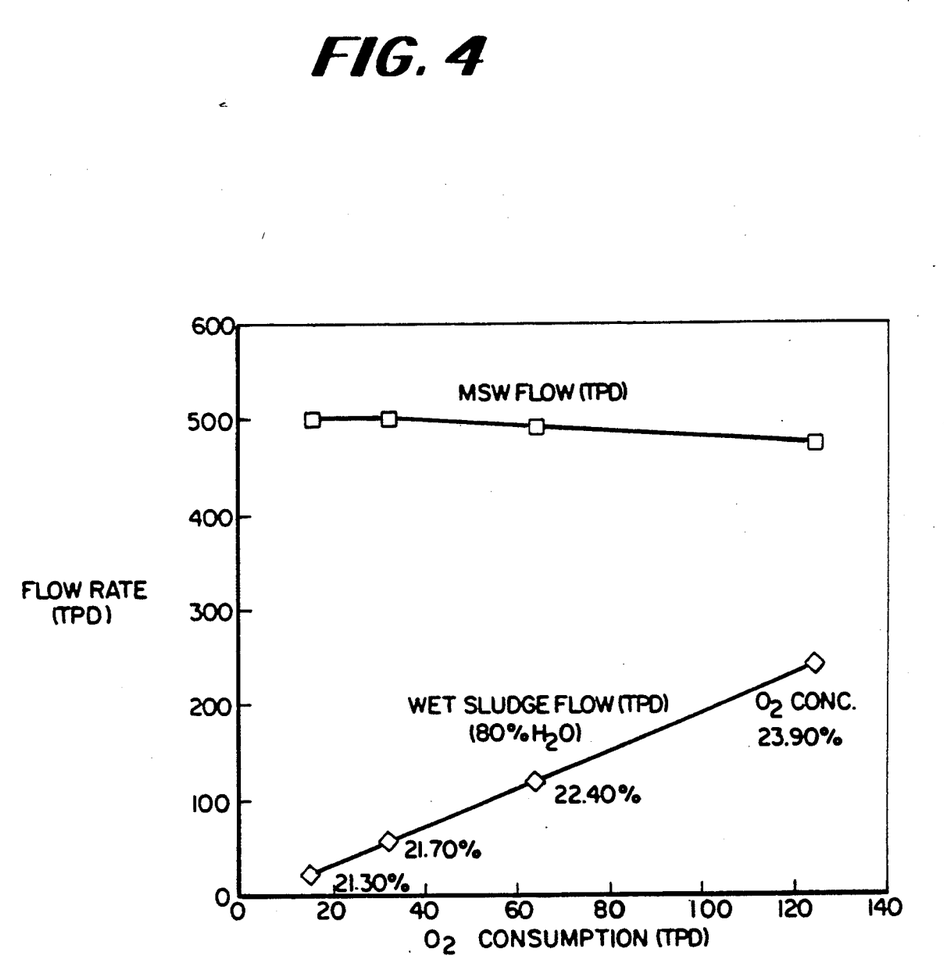
FIG. 4 is a graph showing the relationship between MSW incineration capacity and oxygen consumption at 80% water in the sludge.

FIG. 3 (70 wt. % moisture sludge) and FIG. 4 (80 wt. % moisture sludge) indicate that MSW capacity decreases with an increase in oxygen enrichment and sludge quenching. As indicated above, sludges having moisture contents below about 85% has a positive LHV. Therefore, when the relatively low moisture content sludges are used they release additional heat into the furnace and the MSW must be decreased in order to maintain the total furnace heat release at the design limitations.

Figure 6:
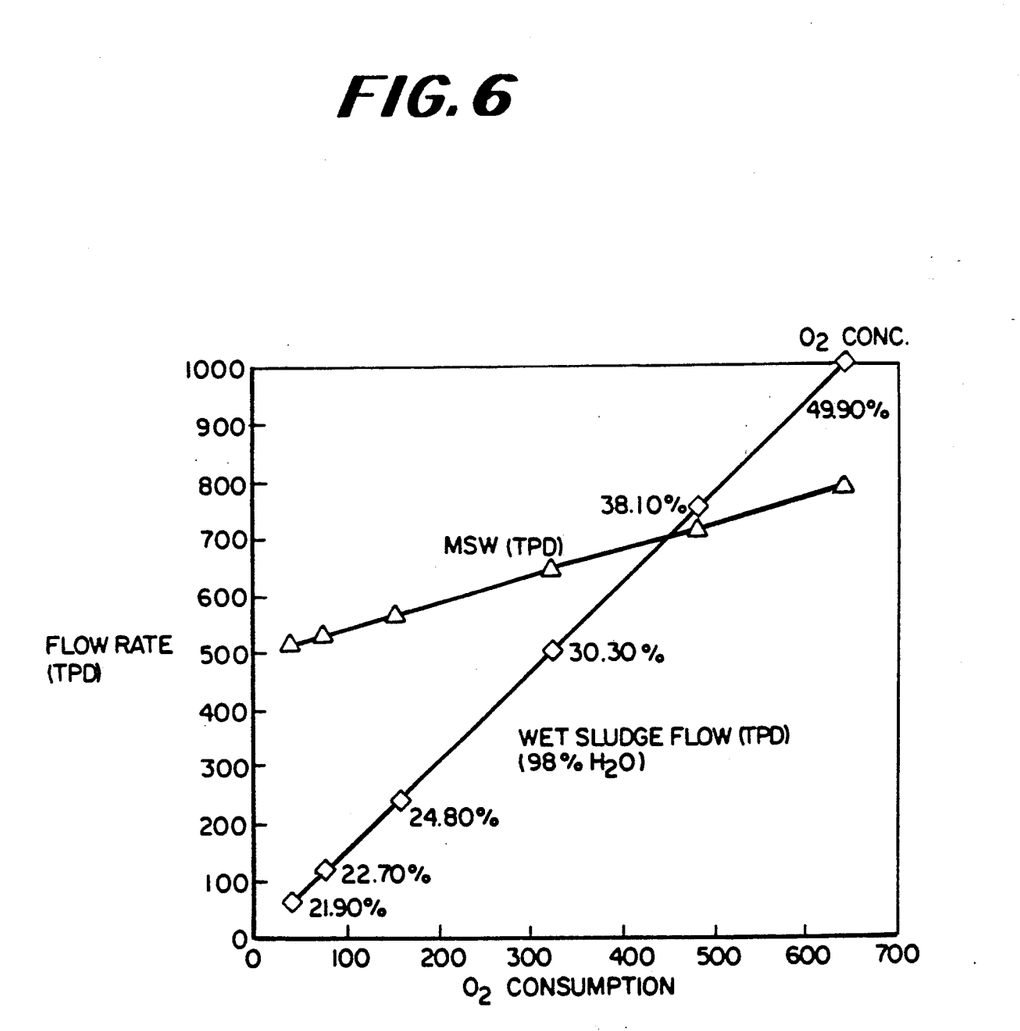
FIG. 6 is a graph showing the relationship between MSW incineration capacity and oxygen consumption at 98% water in the sludge.
Figure 7:
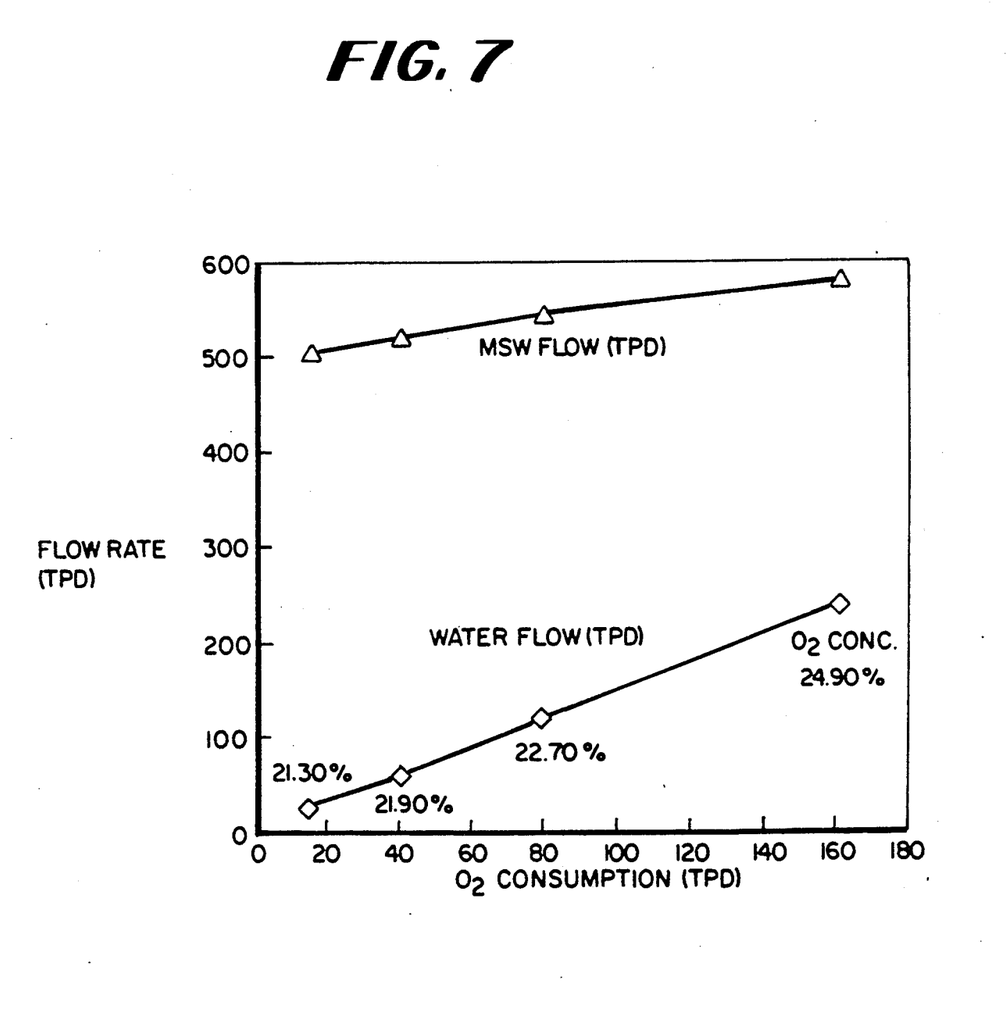
FIG. 7 is a graph showing the relationship between MSW incineration capacity and oxygen consumption at 100% water quench.

FIG. 5 (95 wt. % moisture sludge), FIG. 6 (98 wt. % moisture sludge) and FIG. 7 (100% water) indicate that MSW capacity increases with an increase in $O_2$ enrichment and sludge quenching. Sludges at these high moisture contents have a negative LHV. Therefore, when they are combusted they absorb heat from the furnace requiring additional MSW combustion to keep the total furnace heat release to design limitations and to maintain the furnace temperature constant.

FIG. 2 summarizes the data presented in FIGS. 3-7 and plots total MSW capacity of the incinerator versus wet sludge flow at the five moisture contents, 70%, 80%, 95%, 88% and 100% by weight water. The sixth moisture content was added to show that at a sludge moisture content of 84% the MSW capacity remains unchanged as the sludge incineration rate increases. FIG. 2 clearly shows how the incremental MSW capacity can vary with $O_2$ enrichment depending on the moisture content of the sludge.

FIGS. 3-7 show the performance of the presently claimed process up to a maximum of 50% $O_2$. However, there is no fundamental reason for limiting the $O_2$ enrichment to 50% since the enrichment of the combustion air to 100% $O_2$ is possible by quenching with sludge and adjusting the MSW flow rate to maintain the desired combustion temperature, flue gas flow rate and flue gas excess $O_2$ concentration.

The process of the present invention solves each of the four problems discussed under the BACKGROUND OF THE INVENTION section.

(1) Oxygen enrichment of combustion air normally results in a large increase in combustion temperature due to the removal of inert nitrogen from the flue gas. Any increase in capacity accompanying the enrichment is therefore set by temperature limitations in the furnace or in the downstream boiler. In the process of the present invention, the temperature rise that would normally accompany $O_2$ enrichment is instantly controlled by injection of liquid quench. Since the latent heat capacity of the water in the quench is much larger than the sensible heat capacity of the nitrogen that is removed from the flue gas by the $O_2$ enrichment, the net flue gas flow rate is reduced for the same MSW throughput. Therefore, an increase in the incinerator capacity is achieved without any increase in combustion temperature. The capacity increase associated with enrichment up to a theoretical limit of 100% $O_2$ can be achieved, due to the added degree of freedom from the addition of the liquid quench.

(2) Controlling the combustion conditions and maintaining MSW throughput and steam production during periods when the MSW is very wet is a frequent problem in the operation of MSW incinerators. To maintain a given combustion temperature in an incinerator using high moisture waste, excess air must be decreased. This combined with the higher moisture content of the waste leads to a reduced combustion efficiency, i.e., an increase in the CO concentration in the flue gas, and an increased residence time required in the furnace to achieve total burnout in the bottom ash. The only alternative for an operator faced with the situation of allowing CO concentration in the flue gas to rise above prescribed limits is the necessity of reducing the MSW throughput to a level that can be processed while maintaining the desired ash burnout and combustion efficiency. This, in turn, results in a reduced steam production and power generation in the facility. In the process of the present invention, the two additional control parameters, or degrees of freedom that are added to the process include $O_2$ enrichment and liquid quench flow rate. By carefully controlling these operating parameters, any realistic MSW moisture content can be processed while maintaining heat release in the furnace, i.e., a constant steam production, and total burnout in the bottom ash. For example, when a higher moisture content MSW (one with a lower heating value) is co-incinerated with liquid quench, the quench flow rate is decreased and the MSW flow rate increased such that the total flow rate of MSW solids and water in the combined MSW and quench is the same as during normal operation. Therefore, the temperature and heat release in the furnace remain unchanged. Even in an extreme case when the MSW is so wet that the quench flow is eliminated, the combustion temperature and the MSW throughput can still be maintained by increasing the level of $O_2$ enrichment.

Table II below summarizes the foregoing concepts in which Example 1 is based on the incineration of the typical MSW composition set forth in Table I above containing approximately 25 wt. moisture and Example 2 is based on the incineration of wet MSW, i.e. one containing 40 wt. % moisture. These examples illustrate that with higher moisture content MSW, the MSW throughput increases, the sludge flow decreases, and the combustion conditions and steam production are maintained constant.

TABLE II

|  | Example 1 Typical MSW | Example 2 Wet MSW |
| --- | --- | --- |
| MSW Moisture, Wt. % | 26.1 | 40.0 |
| MSW Throughput TPD | 722 | 913 |
| Wet Sludge Flow | 1000 | 832 |

TABLE II-continued

|  | Example 1 Typical MSW | Example 2 Wet MSW |
| --- | --- | --- |
| (95 wt. % moisture, TPD) |  |  |
| $O_2$ Enrichment, (% $O_2$) | 47 | 47 |
| Combustion Temp., °F. | 2150 | 2150 |
| Steam Production, lbs./hr. | 163,000 | 163,000 |

Tables III and IV below provide a more complete material balance around the MSW-to-steam incineration system of the present invention that is illustrated in FIG. 1 for Examples 1 and 2, respectively.

(3) The incineration of sewage sludge normally requires the use of supplemental fuel to maintain the combustion temperature. Supplemental fuel is also required when raw sewage sludge is coincinerated in significant quantities with MSW. The proposed invention eliminates the need for supplemental fuel by using $O_2$ enrichment of the combustion air to maintain the combustion temperature. In addition, when combined with $O_2$ enrichment. sewage sludge can be disposed of in existing incinerators not originally designed for co-disposal of sludge and MSW, while simultaneously maintaining the original design (the use of MSW alone) combustion temperature, fuel gas flow rate and excess $O_2$.

(4) The use of wastewater generated by the MSW facility or wastewater stream from another source as the liquid quench medium would eliminate any wastewater discharge from the facility or the cost of vaporizing the wastewater in a separate system. The process of the present invention provides a highly effective wastewater disposal option. The wastewater is totally vaporized in the furnace and leaves as substantially pure moisture in the stack gas; organics are destroyed, solids are collected in the bottom ash or captured in the fly ash removal system; and chlorides, sulfur compounds and salts are treated in the existing gas cleanup system.

In summary, the process of the present invention is based on the novel concept of adding two new degrees of freedom to the design and operation of an MSW incinerator: $O_2$ enrichment and liquid quenching. The problems associated with using each degree of freedom separately is solved when they are combined in the manner as presently claimed. $O_2$ enrichment alone results in a rapid rise in combustion temperature, which greatly limits any capacity enhancement that can be achieved. When sewage sludge is co-incinerated with MSW, it reduces the furnace temperature, and severely limits the sludge capacity or necessitates the use of supplemental fuel. However, the combination of $O_2$ enrichment and sewage sludge quenching in accordance with the method of the present invention, allows high levels of $O_2$ enrichment and significant increases in MSW and sludge capacity. with no change in combustion conditions or flue gas flow rate from the original design without enhancement or sludge disposal.

Various modifications of the invention in addition to those embodiments shown and described herein will become apparent to those skilled in the art from the foregoing description and examples. Such modifications are intended to fall within the scope of the appended claims.

TABLE III

EXAMPLE 1

| Stream Name | MSW Feed | Dewatered Sludge Feed | Total Primary and Secondary Air | Oxygen | Flue Gas | Superheated Steam Production |
|---|---|---|---|---|---|---|
| Temperature (°F.) | 60 | 60 | 80 | 60 | 2,150 | 840 |
| Pressure (PSIA) | — | — | 14.7 | 20 | 14.7 | 870 |
| Flowrate (LB/HR) | | | | | | |
| C | 17,090 | 1,792 | — | — | — | — |
| H | 2,287 | 250 | — | — | — | — |
| O | 13,720 | 1,000 | — | — | — | — |
| N | 265 | 167 | — | — | — | — |
| S | 78 | 0 | — | — | — | — |
| Cl | 241 | 0 | — | — | — | — |
| $H_2O$ | 15,724 | 79,166 | 1,595 | — | 118,994 | 163,000 |
| $O_2$ | — | — | 20,816 | 49,030 | 14,608 | — |
| $N_2$ | — | — | 68,530 | 2,257 | 71,218 | — |
| $CO_2$ | — | — | — | — | 68,477 | — |
| $SO_2$ | — | — | — | — | 156 | — |
| HCl | — | — | — | — | 255 | — |
| ASH | 10,771 | 958 | — | — | — | — |
| Total | 60,176 | 83,333 | 90,941 | 51,287 | 273,708 | 163,000 |

TABLE IV

EXAMPLE 2

| Stream Name | MSW Feed | Dewatered Sludge Feed | Total Primary and Secondary Air | Oxygen | Flue Gas | Superheated Steam Production |
|---|---|---|---|---|---|---|
| Temperature (°F.) | 60 | 60 | 80 | 60 | 2,150 | 840 |
| Pressure (PSIA) | — | — | 14.7 | 20 | 14.7 | 870 |
| Flowrate (LB/HR) | | | | | | |
| C | 17,576 | 1,490 | — | — | — | — |
| H | 2,358 | 208 | — | — | — | — |
| O | 14,077 | 832 | — | — | — | — |
| N | 274 | 139 | — | — | — | — |
| S | 84 | 0 | — | — | — | — |
| Cl | 228 | 0 | — | — | — | — |
| $H_2O$ | 30,421 | 65,859 | 1,527 | — | 120,595 | 163,000 |
| $O_2$ | — | — | 19,936 | 50,135 | 14,296 | — |
| $N_2$ | — | — | 65,636 | 2,309 | 68,358 | — |
| $CO_2$ | — | — | — | — | 69,142 | — |
| $SO_2$ | — | — | — | — | 159 | — |
| HCl | — | — | — | — | 241 | — |
| ASH | 11,035 | 797 | — | — | — | — |
| Total | 76,053 | 69,325 | 87,099 | 52,444 | 272,791 | 163,000 |

What is claimed is:

1. In an incineration system comprising a combustion zone, a steam boiler and means for introducing air into the combustion zone, a process for converting solid waste into steam which comprises:
   introducing a solid waste into the combustion zone;
   feeding an air stream into the combustion zone;
   measuring the temperature in the combustion zone;
   measuring the flow of steam leaving the steam boiler;
   measuring and adjusting the flow rate of the solid waste to the combustion zone in response to the flow of steam leaving the steam boiler;
   feeding a quench into the combustion zone;
   measuring and adjusting the flow rate of the quench to the combustion zone in response to the temperature in the combustion zone;
   feeding an oxygen stream into the combustion zone; and
   measuring and adjusting the flow rate of the oxygen stream fed in response to a change in the flow rate of the liquid quench.

2. The process of claim 1 wherein the quench is selected from the group consisting of water, wastewater and wet sludge.

3. The process of claim 1 wherein the combustion zone of the incineration system includes an inclined grate and the solid waste is introduced onto the inclined grate.

4. The process of claim 3 wherein the oxygen stream is added to the air stream and the combined oxygen enriched air stream is fed below the inclined grate.

5. The process of claim 4 wherein a secondary air stream is also added to the combustion zone.

6. The process of claim 5 wherein the secondary air stream is fed above the solid waste on the inclined grate.

7. The process of claim 6 wherein at least a portion of the oxygen stream is added to the secondary air stream.

8. The process of claim 1 wherein the quench is wet sludge having a water content of at least about 85 weight per cent and the quench is fed into the combustion zone through spray means.

9. The process of claim 1 wherein the quench is a wet sludge having a water content of less than about 85 weight per cent and the quench is added to the solid waste prior to introduction into the combustion zone.

10. The process of claim 1 wherein the temperature in the combustion zone is maintained within design parameters.

11. The process of claim 1 wherein the flow of steam leaving the steam boiler is maintained substantially constant.

12. The process of claim 1 wherein a flue gas is removed from the incineration system having a substantially constant concentration of oxygen.

13. The process for controlling the combustion and temperature in a solid waste-to-steam incineration system comprising a combustion zone, a steam boiler and means for introducing oxygen-enriched air into the combustion zone, which process comprises:
introducing a solid waste into the combustion zone to serve as a source of fuel for the generation of steam from the steam boiler;
feeding a primary air stream into the combustion zone to support combustion;
measuring the temperature in the combustion zone;
measuring the flow of steam leaving the steam boiler;
measuring and adjusting the flow rate of the solid waste to the combustion zone to control combustion by maintaining a substantially constant flow of steam leaving the steam boiler;
feeding a liquid quench into the combustion zone;
removing a flue gas from the incineration system;
measuring and adjusting the flow rate of the liquid quench to the combustion zone to control the temperature in the combustion zone within design parameters; and
adding an oxygen stream to the primary air stream; and
measuring and adjusting the flow rate of the oxygen stream added to the primary air stream in response to a change in the flow rate of the liquid quench and to maintain a substantially constant concentration of oxygen in the flue gas.

14. The process of claim 13 wherein the liquid quench is selected from the group consisting of water, wastewater and wet sludge.

15. The process of claim 13 wherein the combustion zone of the incineration system includes an inclined grate and the solid waste is introduced onto the inclined grate.

16. The process of claim 15 wherein the oxygen-enriched primary air stream is fed below the inclined grate.

17. The process of claim 16 wherein a secondary air stream is also added to the combustion zone.

18. The process of claim 17 wherein the secondary air stream is fed above the solid waste on the inclined grate.

19. The process of claim 18 wherein oxygen is added to the secondary air stream.

20. The process of claim 13 wherein the liquid quench is wet sludge having a water content of at least about 85 weight per cent and the liquid quench is added to the combustion zone through spray means.

21. The process of claim 13 wherein the liquid quench is a wet sludge having a water content of less than about 85 weight per cent and the liquid quench is added to the solid waste prior to introduction into the combustion zone.

22. An incineration system for combusting waste and converting the resultant energy of combustion into steam which comprises:
a combustion zone;
means for introducing solid waste into the combustion zone;
means for introducing an air stream into the combustion zone;
means for introducing oxygen into the air stream;
means for measuring the temperature in the combustion zone;
a steam boiler within the incineration system;
means for measuring the steam flow leaving the steam boiler;
means for feeding a quench into the combustion zone;
means for adjusting the amount of solid waste introduced into the combustion zone in response to the flow of steam leaving the steam boiler;
means for adjusting the flow of quench fed into the combustion zone to control the temperature in the incinerator; and
means to control the amount of oxygen introduced into the air stream in response to a change in the flow of the quench.

23. The incineration system of claim 22 wherein an inclined grate is provided in the combustion zone and means is provided for introducing the solid waste onto the inclined grate.

24. The incineration system of claim 23 wherein means is provided for introducing the oxygen-enriched air stream below the inclined grate.

25. The incineration system of claim 24 wherein means is provided for introducing a secondary air stream to the combustion zone.

26. The incineration system of claim 25 wherein means is provided for introducing the secondary air stream above the solid waste on the inclined grate.

27. The incineration system of claim 26 wherein means is provided for adding oxygen to the secondary air stream.

28. The incineration system of claim 22 wherein spray means is provided for feeding the quench comprising a wet sludge having a water content of at least about 85 weight per cent onto the solid waste on the inclined grate.

* * * * *